United States Patent Office 3,787,519
Patented Jan. 22, 1974

3,787,519
HYDROXYL CONTAINING COPOLYMERS
Joseph A. Vasta, Woodbury, N.J., assignor to E. I. du Pont de Nemours and Company, Wilmington, Del.
No Drawing. Original application Oct. 8, 1970, Ser. No. 79,348, now Patent No. 3,679,642. Divided and this application May 11, 1972, Ser. No. 252,353
Int. Cl. C08g 45/10
U.S. Cl. 260—834                8 Claims

ABSTRACT OF THE DISCLOSURE

Polymers of ethylenically unsaturated monomers, containing (A) at least 5% of ethylenically unsaturated carboxylic acid monomer units having active hydrogen atoms replaced with

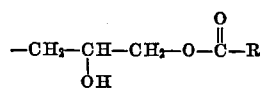

and/or

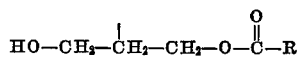

radicals, wherein R is a tertiary aliphatic hydrocarbon radical having the structure

where $R_1$ is —$CH_3$ and $R_2$ and $R_3$ are alkyl groups of 1–12 carbon atoms; and
(B) up through 10% of vinyl pyrrolidone units, and coating compositions containing such polymers.

CROSS-REFERENCE TO RELATED APPLICATIONS

This application is a divisional of application Ser. No. 79,348, filed Oct. 8, 1970.

BACKGROUND OF THE INVENTION

In the fabrication of home laundry appliances, "flowcoating" is used as a method of applying primer enamels. In this method, units are coated by simply allowing a primer enamel to flow over them. Because of the nature of the application, the enamel must be stable and have high solids content. Naturally, it must also provide a finish with good detergent and alkali resistance.

In my U.S. Pat. 3,330,814 I describe and claim polymers of ethylenically unsaturated monomers, having an acid number of up to about 40 and containing at least 5% (by weight of the total polymer) of ethylenically unsaturated carboxylic acid monomer units having active hydrogen atoms replaced with

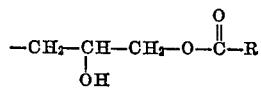

and/or

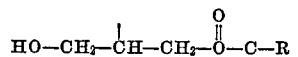

radicals, wherein

R is a tertiary aliphatic hydrocarbon radical having the structure

wherein $R_1$ is $CH_3$ and $R_2$ and $R_3$ are alkyl groups of 1–12 carbon atoms, or wherein R is a tertiary aliphatic hydrocarbon radical of 8–10 carbon atoms.

These polymers, when blended with aminoplast resins and epoxy polyether condensates, as described in column 3 line 42 ff. of my patent, can be made into excellent appliance topcoat enamels and satisfactory flowcoat primer enamels, although the primer enamels are subject to pigment float and their finishes are somewhat deficient in intercoat adhesion and sometimes fail to meet the more stringent industry standards for alkali- and detergent resistance.

I have now found that the properties of these flowcoat primers can be greatly enhanced in these respects if the film-forming polymers, as described in my patent, additionally contain up to 10% (by weight), preferably about 3–8%, even more preferably about 5–6% of vinyl pyrrolidone units. Under some circumstances 1–2% of vinyl pyrrolidone units will be found preferable, and under certain conditions 8–9% may serve best.

I have also found that increasing the acid number of these polymers to about 60 greatly increases their versatility as general film-formers.

Polymers preferred for use in my new flowcoat primer enamels are those having styrene and esterified acrylic acid monomer units, as described in column 1, line 60 ff. of my patent, and also having vinyl pyrrolidone units.

Polymers especially preferred contain from about 30–77% of styrene units, 20–69% of esterified acrylic acid units and up to 10%, preferably 3–8% of vinyl pyrrolidone units.

The most preferred polymers contain 57–62% styrene units, 36–40% esterified acrylic acid units and 5–6% vinyl pyrrolidone units, and have an acid number of 5–20.

METHOD OF PREPARATION

My new polymers are most conveniently made by the method described in column 3, line 29 ff. of my patent and headed "Method 2," with the obvious addition of up to about 10% by weight of vinyl pyrrolidone monomer, which in the preferred case is usually at the expense of styrene.

These liquid polymer preparations can then be made into coating compositions by adding such solvents, pigments, plasticizers or fillers as are necessary, as described in my patent at column 3, line 40 ff. Preferred compositions are made by adding from 5% to 30%, by weight of the composition, of an epoxy polyether condensate, as described in column 3, line 67 ff. of my patent, and from 5% to 75%, by weight of the composition, of an aminoplast resin, as described in column 3, beginning at line 52.

The resulting compositions are usually applied by flowcoating, but can be applied by spraying, dipping, brushing, etc., if desired. However applied, the coats are then baked at 375–425° F., preferably 400° F., for from about 10 to about 20 minutes to give extremely hard primer finishes which provide excellent adhesion between the primer and the topcoat.

It will be clear from the foregoing that all the disclosures in my U.S. Pat. 3,330,814 are relevant to practicing this invention, and I therefore incorporate into this application, by reference, all those disclosures, including the examples. One can practice the present invention according to the general directions in my patent by simply keeping in mind that the film-forming polymers disclosed there are modified here by incorporation of up to 10% of vinyl pyrrolidone units.

DESCRIPTION OF THE PREFERRED EMBODIMENTS

Example 1

A reactor was charged with

| | Parts/wt. |
|---|---|
| Xylene | 134 |
| Aromatic naphtha (B.P. 150–170° C.) | 124 |
| Cardura E | 127 |

This mixture was heated to reflux temperature and held there while a mixture of

| | Parts/wt. |
|---|---|
| Styrene | 260 |
| Acrylic acid | 43 |
| Ditertiary butyl peroxide | 2 |
| Vinyl pyrrolidone | 23 | was added over a 90-minute period. This reaction mass was then held for two hours at reflux temperature, heating was stopped and 20 parts of aromatic naphtha and 89 parts of Cellosolve acetate were added.

The resulting solution contained 55% (by weight) of polymer having an acid number of 15.

To 36 parts of this polymer solution were added 50 parts of rutile TiO$_2$, 2 parts of carbon black, 6 parts of aromatic naphtha (B.P. 150–170° C.) and 6 parts of Cellosolve acetate. This mixture was then sand milled until the particles had an average diameter of 18–22 microns.

To this mill base were then added

| | Parts/wt. |
|---|---|
| Polymer solution (as per above) | 55 |
| Benzoguanamine-formaldehyde resin (66% solids in butanol) | 53 |
| Epon 1001 [1] (50% solids in 50-50 high solvency petroleum naphtha/butanol solution) | 30 |
| Cellosolve acetate | 17 |
| Aromatic naphtha (B.P. 150–170° C.) | 17 |

[1] Described in column 9 of U.S.P. 3,330,814.

This composition was then thinned to application viscosity and flowcoated on a washer shell, flashed for five minutes in a solvent laden atmosphere and then baked 20 minutes at 400° F.

The resulting primer finish had outstanding detergent and alkali resistance.

Example 2

A reactor was charged with

| | Parts/wt. |
|---|---|
| Xylene | 50 |
| Cardura E | 50 |

This mixture was heated to reflux temperature and held there while a mixture of

| | Parts/wt. |
|---|---|
| Styrene | 48 |
| Acrylic acid | 14 |
| Cumene hydroperoxide | 3 |
| Vinyl pyrrolidone | 10 | was added over a four-hour period. The reaction mass was then held for another hour at reflux temperature, heating was stopped and 27 parts of Cellosolve acetate were added.

The resulting solution contained 50% (by weight) of polymer having an acid number of 50.

To 40 parts of this polymer solution were added

| | Parts/wt. |
|---|---|
| Rutile TiO$_2$ | 50 |
| Carbon black | 2 |
| Aromatic naphtha (B.P. 150–170° C.) | 4 |
| Cellosolve acetate | 4 |

This mixture was sand milled until the particles had an average diameter of 18–22 microns.

To this mill base were then added

| | Parts/wt. |
|---|---|
| Polymer solution (as per above) | 60 |
| Benzoguanamine-formaldehyde resin (66% solids in butanol) | 53 |
| Epon 828 [1] | 15 |
| Cellosolve acetate | 22 |
| Aromatic naphtha (B.P. 150–170° C.) | 22 |
| Zinc octoate | 1 |

[1] A condensate made by reacting epichlorohydrin and diphenylol propane. It has a melting point of 65–75° C. and an epoxy equivalent weight of 425–550. The product is sold by the Shell Chemical Company.

These components were thoroughly mixed, the product thinned to application viscosity and applied to a washer shell and baked as in Example 1.

This finish also had outstanding detergent and alkali resistance.

Other specific embodiments of my new polymers can be prepared according to any of Examples 1 through 9 of my patent by simply adding from about 3% to about 8% (by weight) of vinyl pyrrolidone monomer to the appropriate charge. Primer compositions can be made from these polymers according to any of Examples 10 through 13.

I claim:

1. A coating composition comprising, by weight of the total
   (A) 20–60% of a polymer of monoethylenically unsaturated monomers, containing
      (1) at least 5% (by weight of the total polymer) of ethylenically unsaturated carboxylic acid monomer units having active hydrogen atoms replaced with

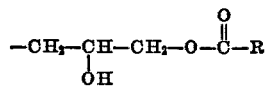

and/or

radicals, wherein R is a tertiary aliphatic hydrocarbon radical having the structure

where R$_1$ is —CH$_3$ and R$_2$ and R$_3$ are alkyl groups of 1–12 carbon atoms, and
      (2) 1% through 10% (by weight of the polymer) of copolymerizable vinyl pyrrolidone units;
   (B) 5–30% of an epoxy-polyether condensate,
   (C) 5–75% of an aminoplast resin, and
   (D) a liquid carrier.

2. A coating composition comprising, by weight of the total
   (A) 20–60% of a polymer of monoethylenically unsaturated monomers, containing
      (1) at least 5% (by weight of the total polymer) of ethylenically unsaturated carboxylic acid monomer units having active hydrogen atoms replaced with

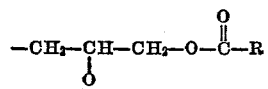

and/or

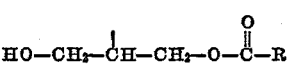

radicals, wherein R is a tertiary aliphatic hydrocarbon group of 8-10 carbon atoms, and
   (2) 1% through 10% (by weight of the polymer) of copolymerizable vinyl pyrrolidone units;
(B) 5-30% of an epoxy-polyether condensate,
(C) 5-75% of an aminoplast resin, and
(D) a liquid carrier.

3. A composition according to claim 1 wherein the monoethylenically unsaturated monomers in (A) are styrene, acrylic acid and vinyl pyrrolidone.

4. A composition according to claim 3, wherein the polymer in (A) comprises 30% through 77% of styrene units, 20% through 69% of esterified acrylic acid units, and 3 through 8% of vinyl pyrrolidone units.

5. A composition according to claim 3, wherein the polymer in (A) comprises 57 through 62% of styrene units, 36 through 40% of esterified acrylic acid units and 5 through 6% of vinyl pyrrolidone units.

6. A composition according to claim 2 wherein the monoethylenically unsaturated monomers in (A) are styrene, acrylic acid and vinyl pyrrolidone.

7. A composition according to claim 2, wherein the polymer in (A) comprises 30% through 77% of styrene units, 20% through 69% of esterified acrylic acid units and 3 through 8% of vinyl pyrrolidone units.

8. A composition according to claim 2, wherein the polymer in (A) comprises 57 through 62% of styrene units, from 36 through 40% of esterified acrylic acid and 5 through 6% of vinyl pyrrolidone units.

References Cited
UNITED STATES PATENTS

| | | | |
|---|---|---|---|
| 3,330,814 | 7/1967 | Vasta | 260—836 |
| 3,366,706 | 1/1968 | Vasta | 260—834 |
| 3,600,459 | 8/1971 | Vasta | 260—834 |

PAUL LIEBERMAN, Primary Examiner

U.S. Cl. X.R.

260—41 B, 78.5 R, 80.72, 86.1 N